Nov. 19, 1946.                F. L. ALBEN                2,411,350
                            LOCOMOTIVE DRIVE
                          Filed June 10, 1943              2 Sheets-Sheet 1
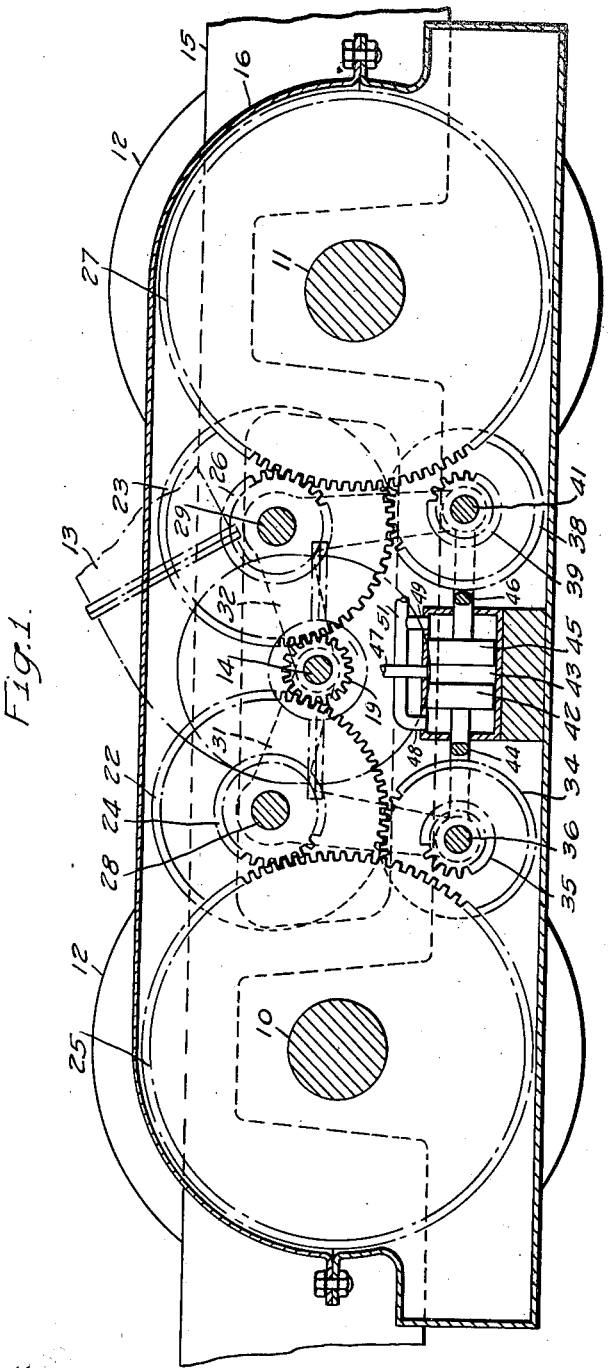
WITNESSES:                                                  INVENTOR
                                                         Frank L. Alben.
                                                            BY
                                                              ATTORNEY

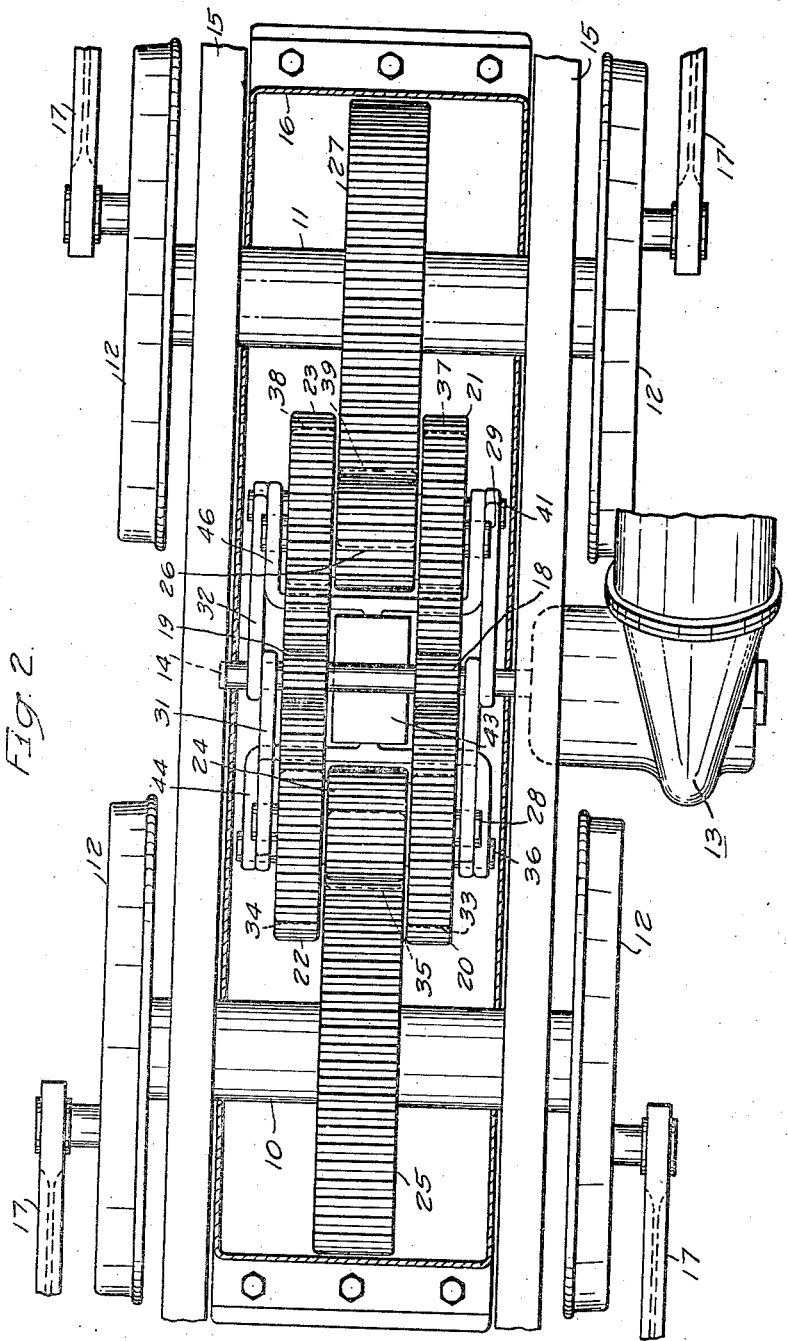

Patented Nov. 19, 1946

2,411,350

UNITED STATES PATENT OFFICE 2,411,350

LOCOMOTIVE DRIVE

Frank L. Alben, Pittsburgh, Pa., assignor to Westinghouse Electric Corporation, East Pittsburgh, Pa., a corporation of Pennsylvania Application June 10, 1943, Serial No. 490,313

2 Claims. (Cl. 105—113)

My invention relates, generally, to locomotive drives and, more particularly, to drives for steam turbine locomotives.

The utilization of a steam turbine for driving a locomotive provides a greater horsepower output and makes possible a higher operating speed. However, in order to utilize a steam turbine it is necessary to provide a reduction gearing capable of transmitting the high horsepower output of the turbine. It is also necessary to provide either a reverse gearing or two turbines, one for forward operation and one for reverse operation. Furthermore, as a practical matter, there is a limitation on the amount of power than can be transmitted through a drive to one axle.

An object of my invention, generally stated, is to provide a locomotive drive which shall be simple and efficient in operation and which may be economically manufactured and installed.

A more specific object of my invention is to provide for transmitting power from one turbine to two or more axles of a locomotive.

Another object of my invention is to provide a reversing mechanism for a turbine-driven locomotive.

A further object of my invention is to provide for operating the reversing mechanism of a turbine-driven locomotive.

Other objects of my invention will be explained fully hereinafter or will be apparent to those skilled in the art.

In accordance with my invention, the torque of a turbine is transmitted to the axles of a locomotive through two reduction gear trains, thereby dividing the load between the two gear trains. The forward and reverse gears are carried by bell crank frames which are actuated by pistons to throw the proper gears in and out of mesh to operate the locomotive in either the forward or the reverse direction.

For a fuller understanding of the nature and objects of my invention, reference may be had to the following detailed description taken in conjunction with the accompanying drawings, in which:

Figure 1 is a view, partially in elevation and partially in section, of a portion of a locomotive structure embodying my invention, and Fig. 2 is a view, partially in plan and partially in section, of the structure shown in Fig. 1.

Referring to the drawings, the portion of a locomotive structure shown therein comprises axles 10 and 11, having wheels 12 mounted thereon, and a turbine 13, having a driving shaft 14 for driving the locomotive. The axles 10 and 11 may be disposed in a locomotive frame 15 in the usual manner. The turbine shaft 14 may be rotatably mounted in a gear case 16 which may be supported by the frame 15 in a suitable manner.

As explained hereinbefore, it is not practical to transmit relatively large amounts of power, such as that required to operate a modern locomotive, through a drive applied to only one axle. Therefore, I have provided a drive capable of transmitting the power developed by a single turbine and applied the drive to a locomotive with a wheel arrangement of the 4–8–4 type which has a total of eight driving wheels, only four of which are shown in the present drawings.

The driving axles are grouped into 2 sets of two each and the turbine is geared to the two intermediate axles 10 and 11 with side rods 17 connecting the wheels 12 to similar wheels mounted on the front and rear driving axles (not shown). Accordingly, the present drive requires a gear unit which is capable of transmitting one-half of the total horsepower output of the turbine to each set of two axles.

As shown, the drive comprises a pair of pinions 18 and 19 secured to the shaft 14, intermediate gears 20 and 21 which mesh with the pinion 18, intermediate gears 22 and 23 which mesh with the pinion 19, a pinion 24 which meshes with an axle gear 25 for driving the axle 10 and a pinion 26 which meshes with an axle gear 27 for driving the axle 11. The intermediate gears 20 and 22 and the pinion 24 are secured to an intermediate gear shaft 28, thereby constituting a reduction gear unit. Likewise, the intermediate gears 21 and 23 and the pinion 26 are secured to an intermediate gear shaft 29, thereby constituting a reduction gear unit for the axle 11. As shown, the pinion 24 is disposed on the shaft 28 between the gears 20 and 22. Likewise, the pinion 26 is disposed on the shaft 29 between the gears 21 and 23.

In this manner the power developed by the turbine 13 is divided between the two sets of reduction gears and transmitted to the two sets of driving axles. The axle gears 25 and 27 are preferably of a resilient type, such as disclosed in my copending application, Serial No. 490,311, filed June 10, 1943.

In order to provide for reversing the locomotive, the shaft 28, which supports the gears 20 and 22 and the pinion 24, is mounted in a bell crank frame 31. Likewise, the shaft 29 which supports the gears 21 and 23 and the pinion 26 is mounted in a similar bell crank frame 32. The bell crank frames are both disposed to pivot about the shaft 14.

As shown, reversing gears 33 and 34, which mesh with the gears 20 and 22, respectively, and a pinion 35 are secured to a shaft 36 which is carried by the bell crank frame 31. Likewise, reversing gears 37 and 38, which mesh with the gears 21 and 23, respectively, and a pinion 39 are secured to a shaft 41 which is carried by the bell crank frame 32.

In order to disengage the pinion 24 from the gear 25 and engage the pinion 35 with the gear 25 a piston 42 is disposed in a cylinder 43. The piston 42 is connected to the shaft 36 by means of a yoke 44. Likewise, a piston 45 is disposed in the cylinder 43 and connected to the shaft 41 by means of a yoke 46. When a pressure fluid is admitted to the cylinder 43 through a pipe 47, the pistons 42 and 45 are moved outwardly to actuate the bell crank frames 31 and 32 about the shaft 14, on which they are pivotally mounted. In this manner, the pinions 24 and 26 are disengaged from the gears 25 and 27, respectively, and the pinions 35 and 39 are engaged with the gears 25 and 27, respectively, thereby reversing the locomotive.

The pistons 42 and 45 may be returned to the position shown in the drawings and retained in this position during forward operation of the locomotive by admitting a pressure fluid to the cylinder 43 through openings 48 and 49 which are connected to a pipe 51. In this manner, the pressure on the pistons 42 and 45 will retain the pinions 24 and 26 in mesh with the gears 25 and 27 during forward operation. Likewise, the application of pressure to the pistons 42 and 45 in the opposite direction will retain the pinions 35 and 39 in mesh with the gears 25 and 27, respectively, during reverse operation. The admission of a pressure fluid to the pipes 47 and 51 to secure the desired operations may be controlled by suitable valve mechanism under the control of the operator of the locomotive.

It will be seen that the bell crank frames 31 and 32 maintain the proper distances between the shaft 14 and the shafts 28 and 29 to keep the gears 20 and 21 in mesh with the pinion 18 and the gears 22 and 23 in mesh with the pinion 19. Likewise, the gears 33 and 34 are kept in mesh with the gears 20 and 22, respectively, and the gears 37 and 38 are kept in mesh with the gears 21 and 23, respectively, at all times. The reversing of the locomotive is accomplished by simultaneously disengaging the pinions 24 and 26 from the gears 25 and 27, respectively, and engaging the pinions 35 and 39 with the gears 25 and 27, respectively, in the manner hereinbefore explained.

From the foregoing description, it is apparent that I have provided a driving mechanism which is capable of transmitting a relatively large amount of power from a single driving or power unit to a plurality of locomotive axles. Furthermore, the mechanism herein disclosed may be utilized to reverse a single power unit, such as a steam turbine, which can be operated in only one direction.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a locomotive driving mechanism, the combination with a pair of axles and wheels secured to each axle, of an axle gear for driving each axle, a driving shaft disposed between the axles, a pinion secured to said shaft, forward operating and reduction gear units intermeshing with said pinion and each of said axle gears, a reverse operating gear unit driven by each of the forward gear units, a bell crank frame for supporting each forward gear unit and its associated reverse gear unit, said bell crank frames having arms pivoted about said driving shaft, and fluid pressure means for operating said bell crank frames to disengage said forward gear units from said axle gears and engage said reverse gears with said axle gear units, said fluid pressure means permitting relative movement between the bell crank frames.

2. In a locomotive driving mechanism, the combination with a pair of axles and wheels secured to each axle, of an axle gear for driving each axle, a driving shaft disposed between the axles, a pinion secured to said shaft, forward operating and reduction gear units intermeshing with said pinion and each of said axle gears, a reverse operating and reduction gear unit driven by each of the forward gears, a bell crank frame for supporting each forward gear unit and its associated reverse gear units, both of said bell crank frames having arms pivoted about said driving shaft, and fluid pressure means for simultaneously actuating both bell crank frames about their pivot point to disengage said forward gear units from said axle gears and engage said reverse gears with said axle gear units, said fluid pressure means permitting relative movement between the bell crank frames.

FRANK L. ALBEN.